United States Patent [19]

Siebels

[11] 4,264,660
[45] Apr. 28, 1981

[54] THERMALLY INSULATED COMPOSITE ARTICLE

[75] Inventor: Johann Siebels, Wolfsburg, Fed. Rep. of Germany

[73] Assignee: Volkswagenwerk Aktiengesellschaft, Fed. Rep. of Germany

[21] Appl. No.: 733,803

[22] Filed: Oct. 19, 1976

[30] Foreign Application Priority Data

Nov. 4, 1975 [DE] Fed. Rep. of Germany ....... 2549256

[51] Int. Cl.³ .......................... F16L 9/10; F16L 9/18; B32B 15/04
[52] U.S. Cl. ...................................... 428/36; 428/329; 428/450; 428/469; 428/472
[58] Field of Search ................. 428/450, 36, 329, 472, 428/469

[56] References Cited

U.S. PATENT DOCUMENTS

| 2,808,338 | 10/1957 | Bruno | 106/69 |
| 2,811,457 | 10/1957 | Speil | 106/69 |
| 3,024,125 | 3/1962 | Lee | 106/85 |
| 3,231,401 | 1/1966 | Price | 106/69 |
| 3,568,723 | 3/1971 | Sowards | 138/111 |
| 3,709,772 | 1/1973 | Rice | 428/332 |
| 3,714,971 | 2/1973 | Venable | 428/36 |
| 3,864,908 | 2/1975 | Le Haye | 428/36 |
| 3,870,595 | 3/1975 | Hawthorne | 428/218 |
| 3,959,063 | 5/1976 | Hawthorne | 428/450 |

FOREIGN PATENT DOCUMENTS 1291567 10/1972 United Kingdom .................... 428/450

Primary Examiner—Ellis P. Robinson
Attorney, Agent, or Firm—Brumbaugh, Graves, Donohue & Raymond

[57] ABSTRACT

A thermally insulated article for conducting high temperature gases, such as exhaust gases from an internal combustion engine. The article comprises a core of ceramic material forming a flow passage and a metal jacket cast directly around the core. According to the invention, the ceramic core consists at least partially of a silicate fiber material.

5 Claims, 1 Drawing Figure

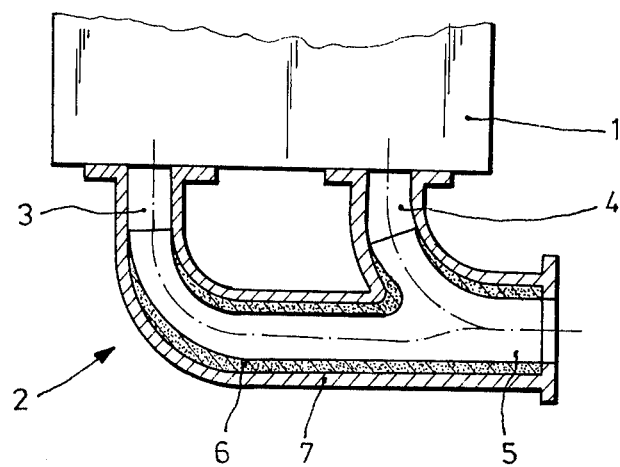

THERMALLY INSULATED COMPOSITE ARTICLE

BACKGROUND OF THE INVENTION

The present invention relates to a thermally insulated composite article or conduit adapted to conduct high temperature gases such as the exhaust gases of an internal combustion engine. The article comprises (1) a core composed of ceramic material and defining at least one flow passage, and (2) a metal jacket cast directly around the core.

Articles of the above-described type are generally known and have been employed, for example, as exhaust gas conduits for internal combustion engines, particularly for motor vehicles. Specific examples of such conduits are disclosed in the U.S. Pat. Nos. 3,568,723 and 3,709,772. The above-noted construction comprising an inner ceramic core and an outer metal jacket cast directly around it advantageously provides for thermal insulation of the exhaust gases flowing through the exhaust conduit, so that the temperature in the exhaust conduit can be kept at a level which offers the most favorable conditions for after-burning those exhaust gas components which were burned only incompletely in the cylinders. With this construction—as opposed to an arrangement in which the metal is surrounded by heat insulation—the metallic conduit jacket is advantageously subjected only to low temperatures, so that consequently also the cylinder head, to which the conduit is directly flanged, is not subjected to any additional thermal stresses caused by heat conduction. Furthermore, since the metallic conduit jacket is manufactured by casting the metal around the ceramic core, a solid bond is obtained between the core and the jacket that is maintained even under the extreme conditions of heat expansion during engine operation.

In order to permit the full-scale commercial use of the above-described article in motor vehicles, it is necessary to find a suitable material for the ceramic core that will satisfy the requirements which this article or conduit is expected to meet. In addition to a chemical resistance to the components contained in the exhaust gases and an adequate strength to withstand the pressure exerted by the cast metal as it solidifies, the material used for the preparation of the core must exhibit superior strength and thermal resistance under conditions of thermal shock since, during the operation of an exhaust gas conduit, the core is subjected to peak temperatures of up to 1400° C. and continuous temperatures of up to 1000° C. In particular, the core material must neither break or tear nor suffer any other damage in the face of the temperature differences of substantial magnitude which occur during casting as well as operation in the field.

SUMMARY OF THE INVENTION

An object of the present invention is to provide a thermally-insulated composite article having a core material which meets the requirements specified above.

According to the present invention, the above object as well as other objects which will become apparent in the discussion that follows are achieved by comprising the ceramic core at least partially of a silicate fiber material. It has been found that a ceramic material composed at least partially of silicate fibers possesses a particularly high resistance to thermoshock, and tests have established that such material is particularly well-suited as the ceramic core for a thermally-insulated exhaust gas conduit.

According to a preferred embodiment of the invention the ceramic core is comprised of a mixture, sintered at temperatures from 1200°–1550° C., consisting of 30–60% by volume aluminum oxide ($Al_2O_3$) powder and 70–40% by volume alumina-silicate fiber. It is advantageous if this mixture of alumina powder and alumina-silicate fibers includes an additive of from 5–20% by weight zirconium silicate. The mixture may further contain additions of catalytically active materials in order to achieve a particularly favorable after-burning effect. These additives which, for example, may be noble metals, rare earths, or other known catalytic materials such as some non-noble metals or non-noble metal oxides, cause an intensification of the thermal conversion reaction in the exhaust gases and thus an increase of the effectiveness of the after-burner.

The ceramic core, if desired, may be provided on its inner surfaces forming the flow passages with an erosion-resistant layer or coating which is especially required if the ceramic material contains a high proportion of silicate fibers. This layer or coating may also contain catalytically active additives in order to favorably influence the after-burning of the unburned exhaust gas components.

BRIEF DESCRIPTION OF THE DRAWING

The single FIGURE is a longitudinal sectional view of an exhaust manifold constructed as a thermally-insulated composite article.

DESCRIPTION OF THE PREFERRED EMBODIMENTS

The single FIGURE shows a dual-connected exhaust gas-collecting conduit or manifold 2, flanged to the cylinder head 1 on one side of a four-cylinder engine of the opposed-cylinder type. The exhaust manifold 2 is provided with two exhaust gas inlet connections 3 and 4 which are flanged on the cylinder head and extend into a common exhaust gas discharge conduit 5.

As is shown in the FIGURE, the exhaust gas manifold 2 has an inner ceramic core 6 formed as a hollow body, and an outer metallic jacket 7 which is cast around the core. During the casting process, the ceramic hollow body 6 serves as the casting core on which the cast jacket is shrunk when the metal melt solidifies. A durable bond is thereby formed between the metallic jacket and the ceramic core. The resulting prestress is sufficiently great so that even the highest wall temperatures occurring during operation of the engine cannot deleteriously affect this bond due to variations in thermal expansion.

The wall thickness of the ceramic hollow core should be between 4 and 12 mm, preferably between 5 and 8 mm, in order to achieve an optimal effect of insulation and thereby favorable conditions for an effective after-burning of the noxious substances still contained unburned in the exhaust gases.

According to the invention, the ceramic core should consist, in part at least, of a silicate fiber material, namely preferably a mixture of from 30–60% by volume alumina ($Al_2O_3$) powder and 70–40% by volume alumina silicate fibers, which mixture is sintered at temperatures within the range of 1200° to 1550° C. It was found that such a ceramic material possesses superior thermoshock properties, and that it is particularly well-suited for the ceramic core of such an exhaust gas-collecting conduit prepared with a metallic jacket cast around the core. This mixture comprising alumina powder and alumina silicate fibers may contain additives, for example of 5–20% by weight zirconium silicate, and other stabilizing additives such as chromium oxide, manganese oxide and copper oxide. It is also possible to add to this blend catalytically active additives such as noble metals or rare earths. Instead of these relatively costly catalytic additives, non-noble catalysts may be admixed too: for example up to 10% by weight of one or several elements of the group consisting of titanium, vanadium, chromium, manganese, iron, cobalt, nickel or copper, or one or several oxides or other compounds of these elements. The total quantity of these additives should not exceed 10% by weight relative to the total weight of alumina powder and alumina silicate fibers.

EXAMPLE 1

50% by volume alumina powder and 50% by volume alumina silicate fibers are mixed in an aqueous silicate binder with an additive of 0.5% by weight chromium oxide ($Cr_2O_3$) for the purpose of preparing an exhaust gas-collecting conduit having approximately the shape illustrated in the drawing. This mass is molded over a wax mold having the shape of the exhaust gas flow channels and calibrated from the outside with the help of molding presses which also consist of wax. The shaped body thus obtained is initially dried for 1 to 2 days at about 40°–50° C., thereafter for about 1 to 2 hours at 150° C., and finally sintered during 10 hours at a temperature of 1350° C. This ceramic core may now be used as the casting core around which the metallic jacket is cast, employing a so-called wax-melting process. A wax model is prepared for this purpose on the ceramic core including also the molding of core markings for exactly mounting and fixing the ceramic core. A hydraulically or chemically-ceramically setting or hardening layer composed of an aluminum silicate cement including a zirconium-silicate additive is then applied to the outer jacket of this wax model, which layer will fix the outer contour of the metallic conduit jacket after the wax model has been removed by melting. This casting mold is subsequently placed into a molding box containing coarse casting masses, such as casting sand, whereupon the casting is carried out using a gray cast iron or aluminum melt which is cast with the help of casting hoppers or the like.

Such an exhaust manifold provided with an outer gray cast iron jacket withstood without any substantial damage during 102 hours of operation at full load; that is, exposure to hot exhaust gas resulting in inside temperatures of more than 900° C., (more particularly, temperatures the range of 950°–1000° C.), and outer temperatures on the cast iron wall of 130°–270° C.

EXAMPLE 2

30% by volume alumina ($Al_2O_3$) powder and 70% by volume alumina silicate fibers are mixed with 5% by weight zirconium silicate and 5% by weight chromium oxide ($Cr_2O_3$) in an aqueous silicate binder. The weight percentages are related to the weight of the alumina powder and silicate fibers. From this mass are molded two half shells, divided in the longitudinal direction, which conform in their dimensions to the ceramic core of the exhaust gas conduit. These molded bodies are first dried; i.e., they are maintained for about 1–2 days at 40°–50° C. and subsequently for 1–2 hours at 150° C., and finally sintered for 10 hours at 1350° C. The inner surfaces of these half shells, on which the exhaust gases will subsequently act, are coated prior to sintering with an aqueous slip composed of very fine granular alumina ($Al_2O_3$) powder having a grain size of 3–10 microns and containing 5% by weight chromium oxide ($Cr_2O_3$) in order to increase the erosion resistance of the inner contour. After sintering, the two half shells are bonded together with a silicate cement, and subsequently provided with a suitable metal jacket, in particular a gray cast iron or aluminum jacket, employing the aforedescribed wax-melting method.

A wax-melting method was used in both examples so that the work could be carried out without establishing tolerances. In large-scale production, however, a sand-casting or masking method such as the Croning process could be employed.

While there have been described what are believed to be the preferred embodiments of the invention, those skilled in the art will recognize that other and further modifications may be made thereto without departing from the true spirit of the invention, and it is intended to claim all such embodiments as fall within the true scope of the invention.

I claim:

1. In a thermally insulated article for conducting high temperature gases, such as internal combustion engine exhaust gases, the article comprising a core of ceramic material forming at least one flow channel and a metal jacket, surrounding the core and cast directly thereon, the improvement wherein the ceramic core consists of a mixture which is sintered at temperatures of 1200°–1550° C., said mixture comprising 30–60% by volume aluminum oxide ($Al_2O_3$) powder and 70–40% by volume alumina silicate fibers.

2. The article defined in claim 1, wherein the mixture of aluminum oxide powder and alumina silicate fibers includes an additive of 5–20% by weight of zirconium silicate.

3. The article defined in claim 1, wherein the mixture includes catalytically active additives.

4. The article defined in claim 1, wherein the ceramic core has an erosion resistant layer on the internal flow channel-forming surfaces thereof.

5. The article defined in claim 1, wherein the ceramic core has a catalytically active layer on the internal flow channel-forming surfaces thereof.

* * * * *